April 29, 1969 M. W. KENNEY 3,441,174
SPIRAL FEED VENDING MACHINE
Filed Aug. 14, 1967 Sheet 1 of 3

INVENTOR.
MAHLON W. KENNEY
BY

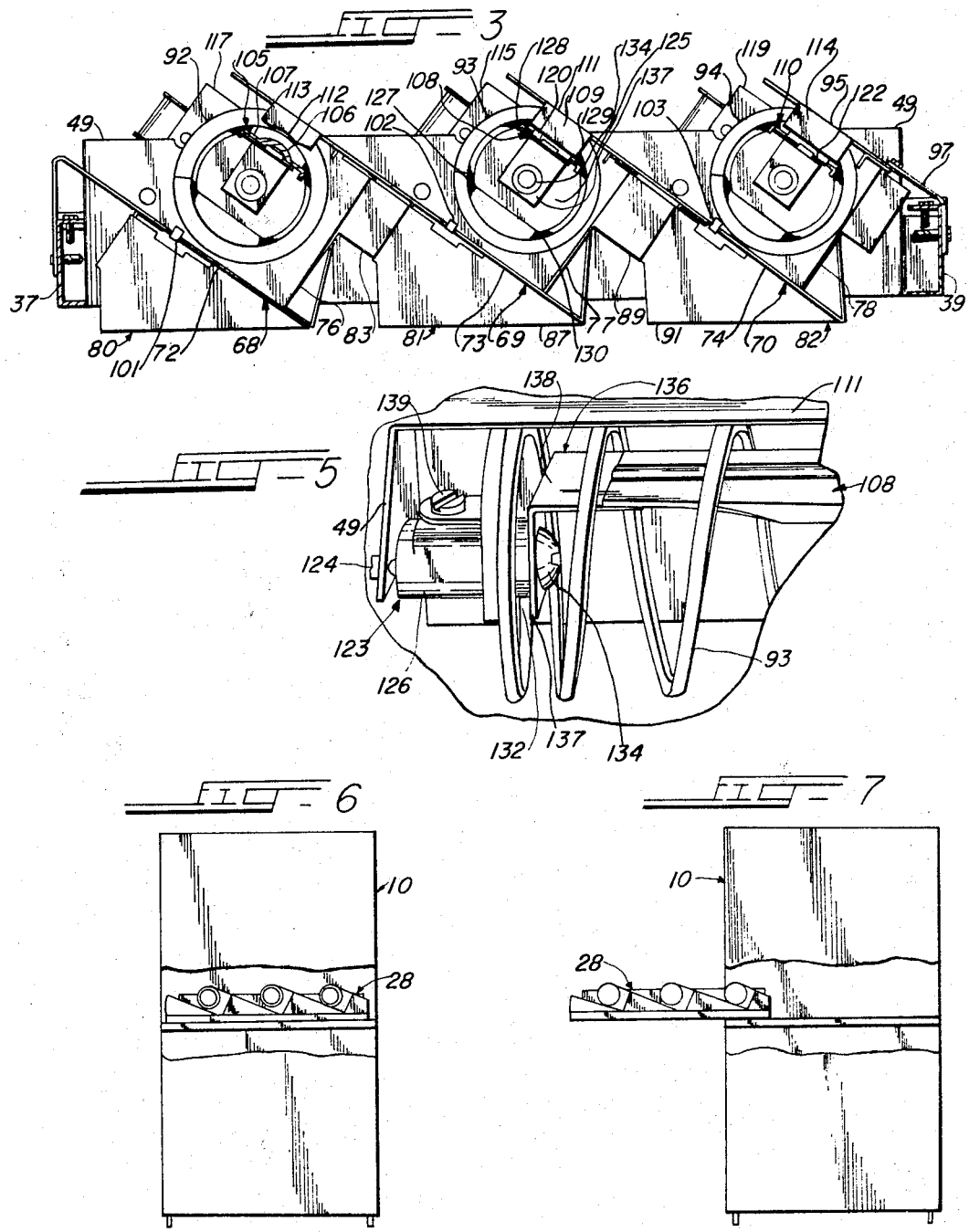

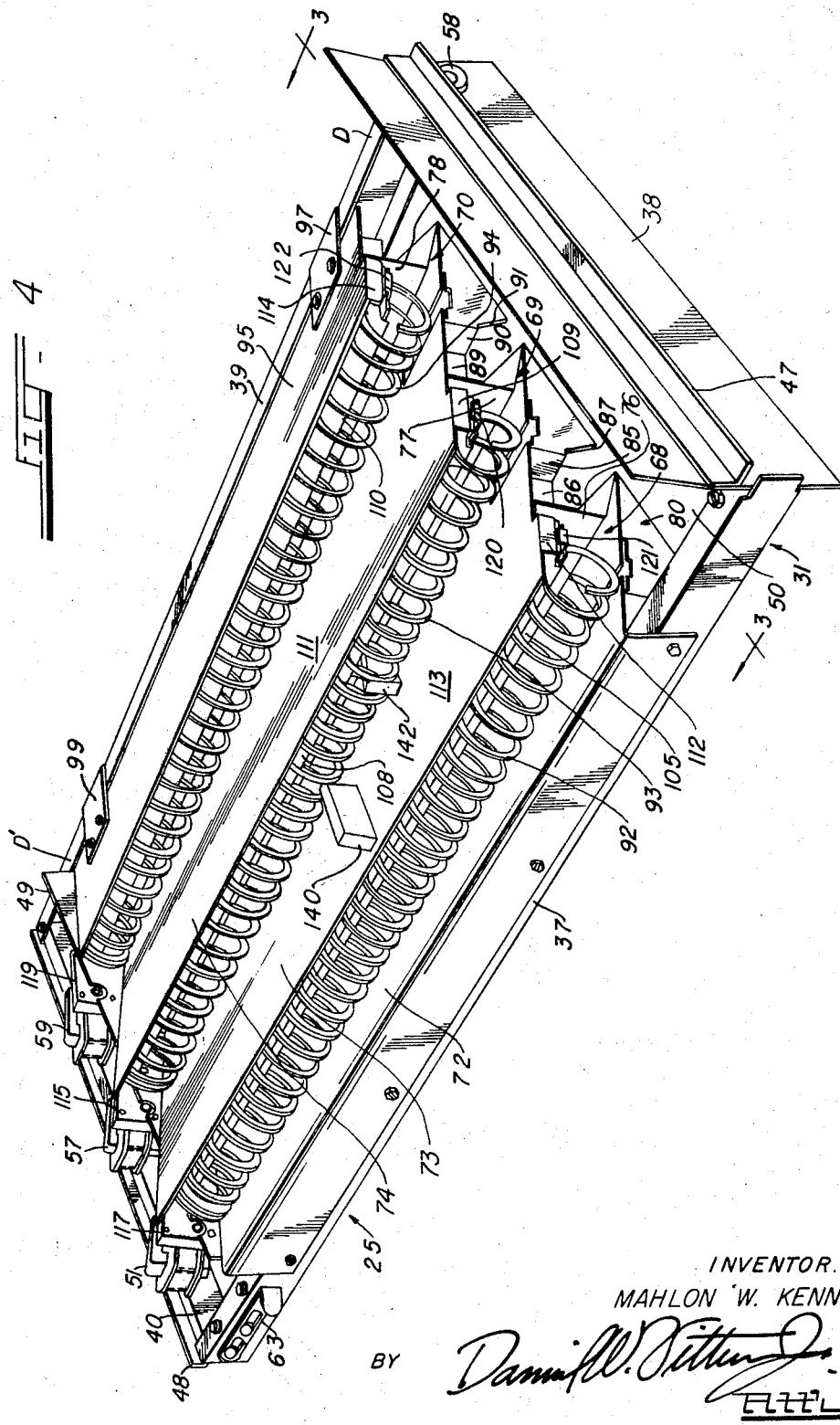

3,441,174
SPIRAL FEED VENDING MACHINE
Mahlon W. Kenney, Chicago, Ill., assignor to The Seeburg Corporation, Chicago, Ill., a corporation of Delaware
Filed Aug. 14, 1967, Ser. No. 660,396
Int. Cl. B65h 29/26, 29/42
U.S. Cl. 221—75         18 Claims

ABSTRACT OF THE DISCLOSURE

The operation of a horizontal spiral feed vending machine can be improved by providing a number of shelves with substantially V-shaped troughs which hold the merchandise items to be vended. Each V-shaped trough is composed of a slide panel and a support panel whereby merchandise items placed on the slide panel are moved by force of gravity from a loading position to a vending position in which they are supported by the support panel. A coil used to transport merchandise items is suspended above each trough and displaced therefrom by a support means extending lengthwise through the interior portion of the coil whereby the coil is suspended along a fixed rotational axis.

BACKGROUND OF THE INVENTION

Field of the invention

This invention relates to vending machines, and more particularly to vending machines suitable for dispensing packaged items such as candy bars and cigarettes and in which a spiral feed mechanism is employed for delivery of successive articles to be vended to a discharge portion of the machine responsive to the energization of a coin-operated control mechanism.

Description of the prior art

Vending machines of the class to which the subject invention relates customarily include a plurality of horizontally disposed helical feeder coils which are oriented within a casing of a machine above a suitable delivery opening. Articles to be vended are positioned within convolutions of the coils such that, upon the rotation of a particular coil in response to actuation of a control mechanism, one of the articles is projected into a delivery opening where it is available to a purchaser.

U.S. Patent No. 3,085,711 (Holstein—Apr. 16, 1963) describes a vending machine having a plurality of horizontal shelves in which a helix is held and guided by a horizontal, rectangular trough in each shelf. Items to be vended are placed between convolutions of the helix with the end portions of the items resting on the shelf at opposite sides of the trough in abutting relation to guide panels which constrain the items to follow a precise path during revolution of the helix. Items are dispensed from left to right as viewed by a purchaser standing in front of the machine.

U.S. Patent No. 3,178,055 (Schuller—Apr. 13, 1965) describes a vending machine in which helical coils are positioned in contact with rectangular troughs located in each shelf within the machine. Items to be dispensed are visible to a purchaser through a window in the front of the machine and are disposed in a front to rear relationship. The vended items are placed between convolutions of the helix coils in abutting relation to guide panels which confine the ends of the items to positions located immediately adjacent the trough housing the coil.

Automatic vending machines of the foregoing type have exhibited certain disadvantages. One problem has been the difficulty of accurately guiding helical coils to insure smooth and uniform rotation thereof with a minimum of frictional resistance and vibration. In many types of machines, it is desirable to employ comparatively long coils to accommodate a maximum number of merchandise items and thereby reduce the need for frequent reloading of the machine. However, the increased length of the coils has further compounded the difficulties incident to accurately guiding each coil as it rotates. For example, in the Holstein and Schuller patents, the helical coils are confined and supported within a trough located in each shelf. As seen in the drawings, the bottom of the helical coil rides directly on the central portion of the trough, and when the coil is rotated, it is prevented from deviating from a defined rotational axis by frictional contact with one side of the trough. (The side of the trough in contact with the coil depends on the direction of rotation.) As might be expected, contact between the sides and bottom of the trough along the entire length of the coil creates undue friction and vibration which limits the usefulness of the resulting machine. Moreover, depressing the helical coil into a trough limits the height of the merchandise item which can be adequately supported by the convolutions of the coil. That is, a larger item could be supported if the entire height of the coil rather than the portion of the coil extending above the shelf surface could be utilized for support.

Accordingly, it is an object of the present invention to provide a vending machine having a helical feeder coil which can be rotated with a minimum of vibration and frictional resistance.

It is another specific object of the present invention to provide a vending machine with a helical feeder coil which can be adapted for use with a wide variety of shapes and sizes of merchandise items.

Another problem encountered in prior art vending machines has been the relative ease with which loading can be accomplished. For example, the particular shelf arrangement described in the Holstein and Schuller patents makes loading a relatively tedious and time consuming task. As previously mentioned, in both the Holstein and Schuller references, the helical coil therein is supported by a trough, and items to be vended must be placed between the convolutions of the helix with end portions of the items resting on the shelf at opposite sides of the trough. Moreover, each shelf has guides on opposite sides of the respective helical coils for confinement of items during progression along the shelf. During loading, the items must be placed exactly within the confining area defined by the convolutions of the helical coil and the associated guides. While such placement does not require unusual dexterity, the necessity of placing each item within a narrowly defined space is time consuming, especially in large capacity machines using a plurality of helical coils.

Consequently, one object of the present invention is to provide a new improved shelf for a vending machine which will reduce the time required to load merchandise items.

Another object of the present invention is to provide an improved shelf for a vending machine in which merchandise items are positioned without undue attention from the operator.

A more specific object of the present invention is to provide an improved shelf for a vending machine wherein a merchandise item is automatically moved into a vending position after being placed in an easily accessible loading position by the operator.

Yet another object of the present invention is to provide an improved loading apparatus for a vending machine wherein a merchandise item is fed by gravity to a vending position by a unique arrangement of shelf components.

SUMMARY OF THE INVENTION

In accordance with the present invention, it has been found that an improved vending machine may be produced by providing in a frame at least one shelf, each shelf having a generally V-shaped trough extending lengthwise thereof, with a helical coil being suspended above and displaced from the trough by an elongated support member extending axially through substantially the entire length of the coil. The helical coil is adapted to receive items of merchandise between the convolutions thereof for axial advancement responsive to rotation of the coil for dispensing at one end thereof. The support member is fixedly mounted at each of its ends, and means are provided for selectively causing rotation of the helical coil. The V-shaped trough of the subject invention comprises a pair of planar members, specifically a slide panel which is oriented at an angle allowing merchandise items placed thereon to be moved by force of gravity, and a support panel which is placed at a substantially right angle with respect to the slide panel whereby items are held in a vending position.

Since the helical coil is supported by a member extending lengthwise through the interior portion thereof, it can be displaced from the surfaces of the trough and still remain oriented along a predetermined axis during rotation. The provision of this unique support means reduces frictional resistance and vibration to a minimum and enables the coil to be used with a wide variety of merchandise items having widely varying dimensions.

The unique arrangement of trough components and helical coil suspension described above eliminates the tedious and time consuming loading problems exhibited by the prior art. Since the slide panel of the V-shaped trough is oriented at an angle designed to overcome the friction of a merchandise item, the item automatically slides into a vending position abutting the support panel by merely placing it in an area at the edge of the slide panel between the convolutions of a helical coil. As a result, the time required to load a vending machine designed according to the present invention will be dramatically decreased over loading operations performed with prior art machines which require precise placement of items in confined areas.

The above techniques, when used in the manner described, have proved supreior to previous systems in providing convenient loading and smooth, vibration-free distribution of items from a helical coil vending machine.

The above-mentioned objects, advantages, and features of the present invention will hereinafter appear, and, for purposes of illustration but not of limitation, an exemplary embodiment is illustrated in the accompanying drawings.

DESCRIPTION OF THE DRAWINGS

FIGURE 3 is an enlarged sectional end view of the shelf and coil apparatus taken along line 3—3 of FIGURE 2.

FIGURE 4 is an enlarged perspective view of the shelf shown in FIGURES 2 and 3.

FIGURE 5 is an enlarged, perspective fragmentary view of the drive end of a preferred coil apparatus.

FIGURE 6 is a fragmentary side plan view of a vending machine designed in accordance with the requirements of the present invention showing an exemplary shelf in a vending position.

FIGURE 7 is a fragmentary side plan view of the same vending machine shown in FIGURE 6 having a shelf extended in a preferred loading position.

DESCRIPTION OF THE PREFERRED EMBODIMENTS

Figure 1:
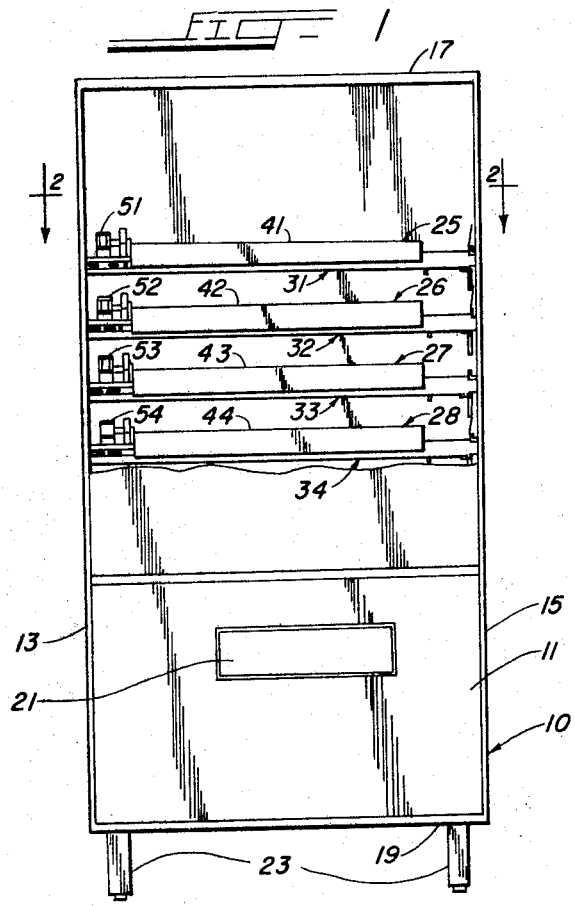
FIGURE 1 is a fragmentary front plan view of a preferred form of a vending machine designed in accordance with the requirements of the present invention.
Figure 2:
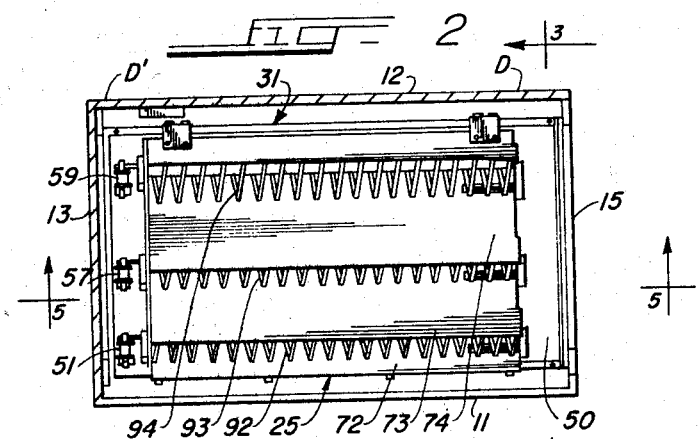
FIGURE 2 is a view of the machine taken along line 2—2 of FIGURE 1 showing a sectional top plan view of a shelf.

With reference to the drawings, FIGURES 1 and 2 show a vending machine cabinet 10 including a door 11, rear panel 12, left side panel 13, right side panel 15, top panel 17, bottom panel 19, legs 23, and dispensing recess 21. Within cabinet 10 are shown shelves 25–28 including shelf support frames 31–34, front panels 41–44, and motors 51–54, respectively.

As best seen in FIGURE 2, a discharge chute 50 is located at the right-hand side of each shelf. This chutes forms a means common to all shelves through which merchandise items fall and are delivered into dispensing recess 21 for manual pickup by the customer.

The number of shelves located in a vending machine utilizing the present invention is not critical, and while four shelves are disclosed in FIGURE 1, substantially any number of shelves could be successfully utilized.

Details of the preferred form of the present invention will be described with reference to shelf 25, since shelves 26–28 are made in accordance with the same principles.

As best seen in FIGURES 2–5, shelf 25 comprises a generally rectangular frame 31, troughs 68–70, coils 92–94 and support members 105, 108, and 110. It should be understood that the advantages of the present invention do not depend on the number of troughs or coils utilized by a particular shelf and that the three troughs and coils shown in connection with shelf 25 are merely exemplary.

As best seen in FIGURE 4, frame 31 includes a front member 37, a right hand member 38, a rear member 39, and a left hand member 40 as well as a discharge end D and a driving end D'. Also connected to the frame are a right hand roller 58, a left hand roller (not shown), a right hand roller bracket 47, left hand roller bracket 48, a left side panel 49, a lock 63, and motors 51, 57, and 59.

Troughs 68–70 comprise slide panels 72, 73, and 74 and support panels 76, 77, and 78, respectively. As best seen in FIGURE 3, slide panels 72–74 are oriented at an angle sufficient to overcome the frictional resistance to movement of a merchandise item placed thereon. In other words, the slide panels are oriented so that a merchandise item will side into a respective support panel (76, 77 or 78) under the influence of gravity when it is placed on an area at the exposed edge of a slide panel. Experience has shown that the force of friction can generally be overcome by orienting the slide panels at approximately 30° with respect to the horizontal plane. However, the exact orientation of the panels might need to be altered depending on the weight of and type of wrapper used with a particular merchandise item.

In the preferred practice of the invention, a pair of panels 113 and 111 (FIGURE 3), which form extensions of panels 73 and 74 respectively, are placed over coils 92 and 93 respectively. Extension panels 111 and 113 serve not only to increase shelf rigidity and strength for securing support members 105 and 108, but also tend to prevent contacts between long, semi-rigid merchandise items and adjacent helical coils. For example, long, flexible items placed on slide panel 73 are prevented from interfering with coil 92 by extension 113.

Support panels 76–78 are oriented at a 90° angle with respect to the slide panels 72–74, and therefore are oriented approximately 60° with respect to a horizontal plane. As previously mentioned, the support panels 76–78 serve as a means of stopping a merchandise item when it has slid into a vending position at the bottom end of its associated slide panel.

In order to provide a firm foundation for troughs 68–70, support brackets 80–82 are connected thereto (see FIGURES 3 and 4). More specifically, bracket 80 comprises a single member, bracket 81 comprises members 83, 85, and 87, and bracket 82 comprises members 89, 90, and 91.

In order to provide a means for supporting helical coil 94, support panel 95 is oriented thereabove and is connected to rear frame member 39 by brackets 97 and 99 (see FIGURE 4).

At the delivery end D of troughs 68–70 are empty switches 101, 102, and 103 (see FIGURE 3) which are actuated when the last merchandise item in a shelf has been dispensed. After actuation of one of the switches, if a purchaser were to select an item normally dispensed from an empty helical coil, a light on door 11 would operate to indicate that the selected item has been sold out as is conventionally known in the art. When merchandise is available in a respective shelf, the weight of the item waiting to be dispensed will cause the mechanical switch to be depressed. This condition enables an attached motor to rotate the helical coil and vend the item when a selection is made. However, when there is no weight on the switch due to a lack of merchandise items on the shelf, the empty switch is in a raised (opened) condition, and the coil will not rotate.

Three helical coils 92, 93, and 94 are located on shelf 25 directly above and displaced from V-shaped troughs 68, 69, and 70 respectively.

The placement of a given helical coil with respect to a support panel and slide panel depends, to a certain extent, on the type of merchandise vended. For example, the distance between coil 92 and support panel 76 must be small enough to engage the shortest item vended and yet large enough to provide sufficient support to advance the longest item vended as the coil rotates. Likewise, there is an optimum distance between the bottom of coil 92 and slide panel 72. That is, the distance should be small enough to prevent the thinnest item vended from riding or sliding underneath the coil convolutions, and large enough to allow adequate clearance for the tallest item vended. The optimum distance for merchandise items appropriate for use in the subject vending machine can easily be determined once the dimensions of the merchandise items are known.

As best seen in FIGURES 2, 3, and 5, coils 92–94 are suspended by identical support members 105, 108, and 110. For example, helical coil 92 is suspended wholly by support member 105 consisting of center bead 106 and bar 107 (see FIGURE 3). Support member 105 is positioned so that coil 92 is displaced from slide panel 72 and support panel 76 of trough 68. As a result, the entire weight of the coil is borne by its points of contact with support member 105 which enables the coil to rotate with a minimum of frictional resistance and vibration. The support members 108, 110 associated with coils 93 and 94 respectively are constructed identically to support member 105 and can be understood with reference thereto.

At the discharge end D of each shelf (adjacent chute 50), each support member is held in place by a metal lip and a support bracket. For example, a lip 109, which secures support member 108, is a protrusion formed on extension 111 and is bent at a 90° angle thereto. A bracket 120 is connected between the inside surface of lip 109 and the lower surface of support member 108 and prevents movement thereof in both the vertical and horizontal planes. It is to be understood that other forms of attaching the discharge end of the support members would be obvious to those skilled in the art.

In a like manner, support member 105 is held in place by a lip 112 and a bracket (not shown), and a support member 110 is secured by a lip 114 and a bracket 122.

At the drive end D' of shelf 25, coils 92–94 are attached to motors 51, 57, and 59 and support members 105, 108, 110 as shown in FIGURE 4. Motor 51 is rigidly attached to left side panel 49 by a mounting bracket 117. In a like manner motors 57 and 59 are held in position by mounting brackets 115 and 119 respectively.

The attachments of coils 92–94 to their respective motors and support members are identical and may be understood from the exemplary attachment of coil 93 shown in FIGURE 5. A shaft 124 is connected between motor 57 and an end fitting 126 of a coupler 123 through a hole in left side panel 49. Coupler 123 is also connected to a plate 125 (see FIGURE 3) which is welded to coil 93 at points 127, 128, 129, and 130. As a result, there is a direct connection between shaft 124 of motor 57 and helical coil 93, so that a 1° angular displacement of shaft 124 results in a corresponding 1° displacement of coil 93.

As best seen in FIGURE 5, support member 108 is rigidly held in a fixed position at the top interior portion of coil 93. A spacer 132 is placed between plate 125 and a lower arm 137 of a bracket 136, arm 137 being fitted over shaft 124 in line with a hole drilled therein. Lower arm 137 is secured in position by a cap 134 placed over the end of shaft 124, and an upper arm 138 of bracket 136 is connected directly to support member 108. In this manner, support member 108 is rigidly held in place and is able to guide the movement of coil 93 along a fixed axis of rotation.

It should also be noted that vertical displacement of coil 93 is further prevented by the underside of extension 111 which is placed over the coil. Screw 139 provides a convenient means for securing coil 93. In order to remove the coil, it is only necessary to loosen screw 139, remove bracket 120 (at the discharge end D), and bend lip 109. Then coil 93 and support member 108 can easily be removed and another coil substituted. Coils with convolutions of various pitches are frequently required to efficiently dispense merchandise items of various widths. Consequently, convenient removal and insertion of coils is a valuable feature.

It is to be understood that various methods of attaching support member 108 and coil 93 will be apparent to those skilled in the art. The apparatus and methods used to secure coils 92 and 94 (and support members 105, 110) are identical to the methods described in connection with coil 93, and, consequently, are not explained in detail.

A machine designed according to the present invention is adapted to operate on the so-called "first-in, first-out" principle, i.e., items first put in the machine are the first to be vended, to avoid items remaining for a long time in the machine and becoming stale. In order to service the machine, door 11 is opened and the shelf to be loaded is extended as illustrated in FIGURE 7. All shelves in cabinet 10 are suspended on rollers (such as roller 58—FIGURE 4) and roller brackets (such as bracket 47—FIGURE 4) in a conventional manner. Consequently, after door 11 is opened, the operator need only release lock 63 and pull the desired shelf into its extended position shown in FIGURE 7 in order to provide convenient access to the helical coils therein. The shelves are conveniently loaded by placing a merchandise item in respective troughs between each convolution of a helical coil. During the loading process each item need not be placed in a precise location since the slide panel of each trough is oriented at an angle enabling the item to slide between the coil convolutions into final vending position without the aid of the operator. For example, in order to load trough 69 of shelf 25, the operator need only place a merchandise item in an area on the edge of slide panel 73 between a coil convolution as shown by the position of item 140, FIGURE 4. After the item is released, it will slide down panel 73 and come to rest against support panel 77 in the proper vending position, as shown by item 142, FIGURE 4. As a result, loading time is substantially reduced in comparison with prior art machines which require the operator to place the item within the narrow confines of guide members and shelf panels which establish the final vending position. Normally, there will be some items remaining in the discharge end of each trough and the operator need only reload the coil convolutions located toward the left-hand end (i.e., drive end D') of each trough so as to retain the first-in, first-out delivery sequence. After each of the shelves has been loaded, it is slid back into cabinet 10 and locked and is then ready for vending operation.

When a purchaser desires to operate the machine, the deposits the required coints and pushes a button located beneath the desired item displayed in a window located in door 11. If the value of the coins deposited is sufficient and the supply of the desired item is not exhausted, the proper helical coil is rotated one revolution in a single direction by an associated motor (such as motor 57) which releases the desired item into discharge chute 50 and exposes it to access by the purchaser through dispensing slot 21. Obviously, in order to move the item toward the discharge end, the motor must be adapted to revolve in one direction only. Suitable circuitry (such as a conventional carry-over switching arrangement) for effecting single revolution operation of a motor in a predetermined direction and suitable coin mechanisms which control the operation of such circuitry are well known in the prior art and do not per se form a part of the present invention.

By way of example, if the purchaser establishes sufficient credits in the coin-receiving mechanism by the deposit of coins and operates a button corresponding to the merchandise items stored in helical coil 93, electrical circuitry causes motor 57 and coil 93 to revolve exactly one revolution. During the revolving operation, the item located on the discharge end of trough 69 is pushed into discharge chute 50 by the advancing coil and subsequently appears in dispensing slot 21. As coil 93 revolves, a new item is advanced to the edge of trough 69 in preparation for another vending operation. During the operating cycle, a few points of contact between support member 108 and coil 93 guide the coil along a predetermined axis of rotation with a minimum of frictional resistance and vibration. The smooth operation of coil 93 is also enabled, in part, by the displacement of the coil from slide panel 73 and support panel 77.

After all items located in trough 69 have been vended, empty switch 102 is actuated and circuitry well known in the art energizes a "sold out" sign above the appropriate window in door 11 and prevents further operation by motor 57 and coil 93. All other helical coils located in the vending machine operate in the same manner.

It should be understood that the embodiments described are merely exemplary of the preferred practices of the present invention and that various changes, modifications, and variations may be made in the arrangements, operations, and details of construction of the foregoing disclosure, without departing from the spirit and scope of the present invention, as defined in the appended claims.

I claim:

1. In a vending machine comprising:
   frame means;
   at least one shelf means;
   means mounting the shelf means in the frame means for movement between an inaccessible vending position and an accessible loading position;
   at least one helical coil means in association with each shelf means and adapted to receive items of merchandise between the convolutions thereof for axial advancement responsive to rotation of the coil means for dispensing at one end thereof; and
   means for causing rotation of each helical coil means responsive to customer selection;
   an improvement in the mounting for the helical coil means comprising:
   an elongated support member for each helical coil means fixedly mounted at each of its ends and passin axially through at least substantially the entire length of the associated helical coil means thereby to suspend the coil means above and out of engagement with the shelf means.

2. An improvement, as claimed in claim 1, wherein the shelf means comprise:
   generally V-shaped trough means positioned beneath each helical coil means and in axial alignment therewith, the elongated support member being positionsd so as to suspend the helical coil means partially within the trough but out of contact therewith.

3. An improvement, as claimed in claim 2, wherein each trough means comprises a pair of generally planar members disposed at substantially a right angle to one another, with one of said members being wider than the other and oriented at an angle with reference to the horizontal so as to permit merchandise items placed thereon to slide downwardly under the influence of gravity so as to be received within the convolutions of the helical coil means.

4. An improvement, as claimed in claim 3, wherein a plurality of helical coils and corresponding trough means are provided on each shelf, the said one planar member of each trough means but one being extended upwardly so as to overlie an adjacent helical coil.

5. An improvement, as claimed in claim 1, wherein the means for causing rotation of the helical coil means comprises:
   power means having a drive shaft;
   connecting means operatively linking the other end of the helical coil means to the drive shaft whereby the helical coil means is rotatable with the drive shaft, the drive shaft being journaled in one end of the support member for rotation with respect thereto, whereby said one end of said member is supported.

6. An improvement, as claimed in claim 5, wherein the connecting means includes:
   a plate fixed to the said other end of the helical coil means;
   a drive member mounted on the motor drive shaft for rotation therewith; and
   means removably interconnecting the plate and the drive member.

7. An improvement, as claimed in claim 4, wherein said vending machine comprises a plurality of shelf means.

8. In a vending machine comprising:
   frame means;
   at least one shelf means;
   means mounting the shelf means in the frame means for movement between an inaccessible vending position and an accessible loading position;
   at least one helical coil means in association with each shelf means and adapted to receive items of merchandise between the convolutions thereof for axial advancement responsive to rotation of the coil means for dispensing at one end thereof; and
   means for selectively causing rotation of each helical coil means responsive to customer selection,
   an improvement in the shelf means comprising:
   a V-shaped trough formed by a pair of side members disposed at an angle to one another which members are joined along a line beneath the helical coil means and in axial alignment therewith with the helical coil means extending at least in part into the V-shaped trough.

9. In a vending machine comprising:
   frame means;
   at least one shelf means;
   means mounting the shelf means in the frame means for movement between an inaccessible vending position and an accessible loading position;
   at least one helical coil means in association with each shelf means and adapted to receive items of merchandise between the convolutions thereof for axial advancement responsive to rotation of the coil means for dispensing at one end thereof; and
   means for selectively causing rotation of each helical coil means responsive to customer selection,
   an improvement in the shelf means comprising:
   a generally V-shaped trough positioned beneath the helical coil means and in axial alignment therewith and into which the helical coil means extends at least in part,
   the said trough means comprising a pair of planar members disposed at right angles to one another, one of said members being wider than the other and oriented at an angle with reference to the horizontal so as to permit merchandise items placed thereon to slide downwardly under the influence of gravity so as to be received within the convolutions of the helical coil means.

10. An improvement, as claimed in claim 9, wherein a plurality of helical coils and corresponding trough means are provided on each shelf, the said one planar member of each trough means but one being extended upwardly so as to overlie an adjacent helical coil.

11. An improvement, as claimed in claim 10, wherein said vending machine comprises a plurality of shelf means.

12. In a vending machine comprising:
a frame;
a plurality of shelves;
means mounting each shelf in the frame for movement between an inaccessible vending position and an accessible loading position;
a plurality of helical coils in association with each shelf and adapted to receive items of merchandise between the convolutions thereof for axial advancement responsive to rotation of the coil means for dispensing at one end thereof; and
means for selectively causing rotation of each helical coil means responsive to customer selection,
an improved helical coil mounting and shelf comprising:
an elongated support member for each helical coil fixedly mounted at each of its ends and passing through at least substantially the entire length of the associated helical coil thereby to suspend the coil above and out of engagement with the associated shelf;
a generally V-shaped trough in each shelf positioned beneath each helical coil and in axial alignment therewith,
the elongated support member being positioned so as to suspend the helical coil partially within its associated trough but out of contact therewith,
each trough comprising a pair of generally planar members disposed at substantially a right angle to one another, the line of intersection of said planar member being aligned with and beneath the axis of the helical coil,
one of said members being wider than the other and oriented at an angle with reference to the horizontal so as to permit merchandise items placed thereon to slide downwardly under the influence of gravity so as to be received within the convolutions of the helical coil means,
the said one planar member for each trough but one on each shelf being extended upwardly so as to overlie but not contact an adjacent helical coil,
each means for causing selective rotation of its associated helical coil comprising:
an electric motor having a drive shaft;
a driving sleeve mounted on the drive shaft for rotation therewith;
a plate being fixed to the other end of each helical coil;
means removably interconnecting the plate and the driving sleeve,
each drive shaft being journaled for rotation in a bracket provided on the adjacent end of its associated support member,
whereby support is provided for said member, the other end of each support member being fixed to a portion of the generally V-shaped trough of an adjacent helical coil.

13. In a vending machine, the combination comprising:
a frame;
at least one shelf means;
means mounting the shelf means in the frame for movement between an inaccessible vending position and an accessible loading position;
at least one helical coil means in association with each shelf means and adapted to receive items of merchandise between the convolutions thereof for axial advancement responsive to rotation of the coil means for dispensing at one end thereof;
an elongated support member for each helical coil means fixedly mounted at each of its ends and passing axially through at least substantially the entire length of the associated helical coil means thereby to suspend the coil means above and out of engagement with the shelf means; and
means for selectively causing rotation of each helical coils means responsive to customer selection.

14. A vending machine, as claimed in claim 13, wherein each shelf means comprises:
a generally V-shaped trough means positioned beneath each helical coil means and in axial alignment therewith,
the elongated support member being positioned so as to suspend the helical coil means partially within the trough but out of contact therewith.

15. A vending machine, as claimed in claim 14, wherein a plurality of shelf means are provided in said machine and a plurality of helical coil means are provided in association with each shelf.

16. A vending machine, as claimed in claim 15, wherein each trough means comprises a pair of generally planar members disposed at substantially a right angle to one another, the line of intersection thereof being aligned with and beneath the associated helical coil means, the said one planar member of each trough means but one being extended upwardly so as to overlie an adjacent helical coil.

17. A vending machine as claimed in claim 16, wherein the means for causing selective rotation of each helical coil means comprises:
motor means including a drive shaft;
connecting means operatively linking the other end of the helical coil means to the drive shaft whereby the helical coil means is rotatable with the drive shaft,
the drive shaft being journaled in one end of the support member for rotation with respect thereto,
whereby said one end of said member is supported.

18. A vending machine, as claimed in claim 17, wherein the connecting means includes:
a plate fixed to the said other end of the helical coil means;
a drive member mounted on the motor drive shaft for rotation therewith; and
means removably interconnecting the plate and the drive member.

References Cited

UNITED STATES PATENTS 3,269,595   8/1966   Krakauer _____ 221—75
3,335,907   8/1967   Holstein et al. _____ 198—213 X STANLEY H. TOLLBERG, *Primary Examiner.*